Mar. 20, 1923.

R. MacEACHEN

COAL ELEVATING AND CONVEYING APPARATUS

Filed Dec. 18, 1920

Mar. 20, 1923.　　　　　　　　　　　　　　　　　　　1,448,756
R. MacEACHEN
COAL ELEVATING AND CONVEYING APPARATUS
Filed Dec. 18, 1920　　　　　　7 sheets-sheet 3

Inventor,
Roderick MacEachen
By Jerry A Mathews
and Lester L Sargent
Attorneys

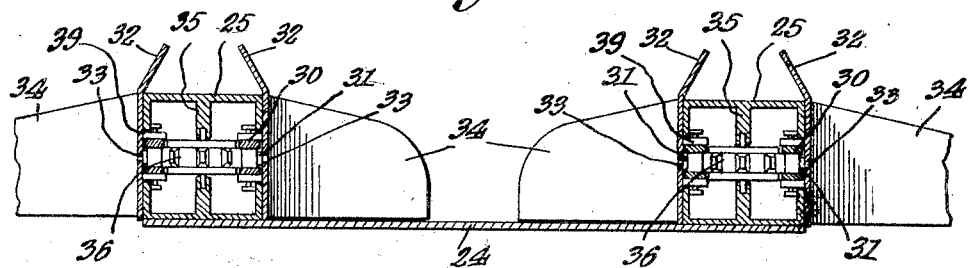
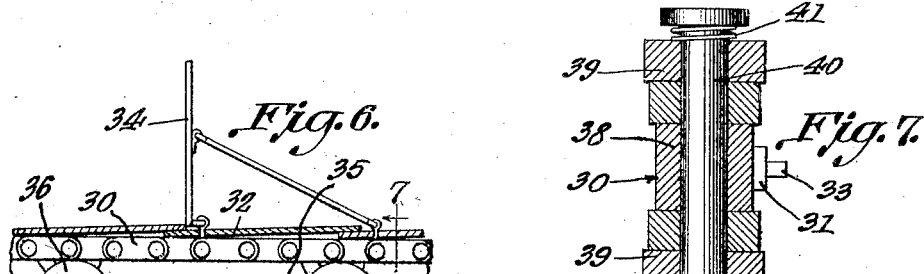
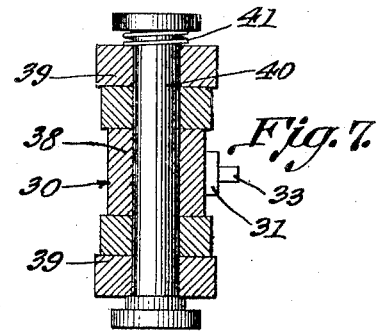
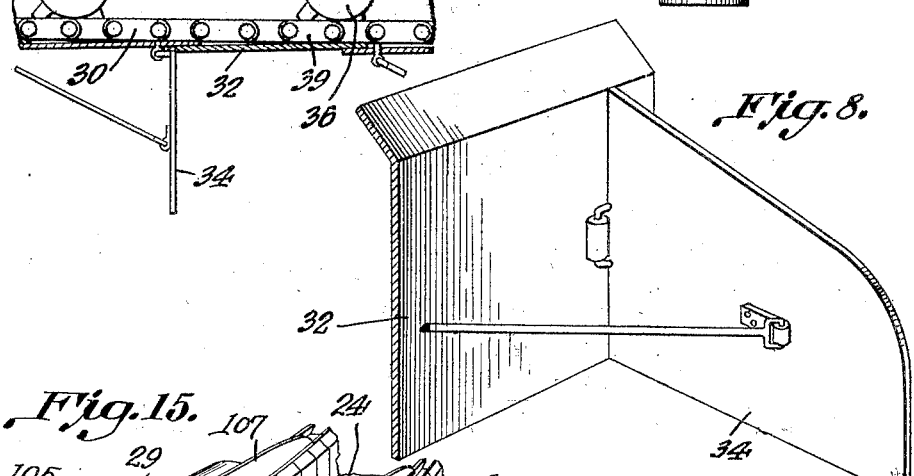
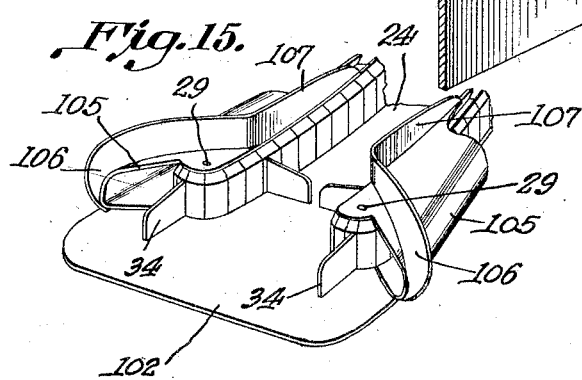

Mar. 20, 1923.
R. MacEACHEN
1,448,756
COAL ELEVATING AND CONVEYING APPARATUS
Filed Dec. 18, 1920
7 sheets-sheet 5
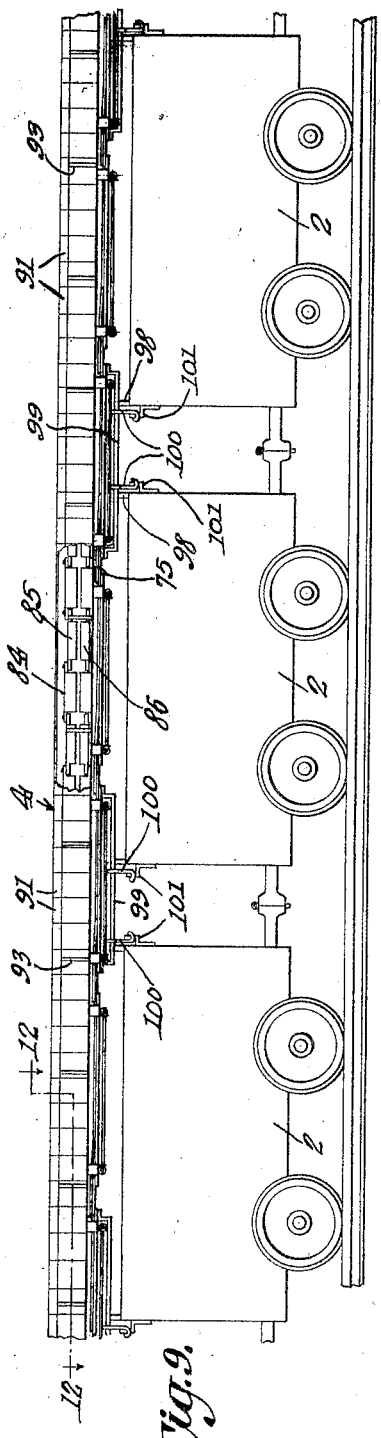
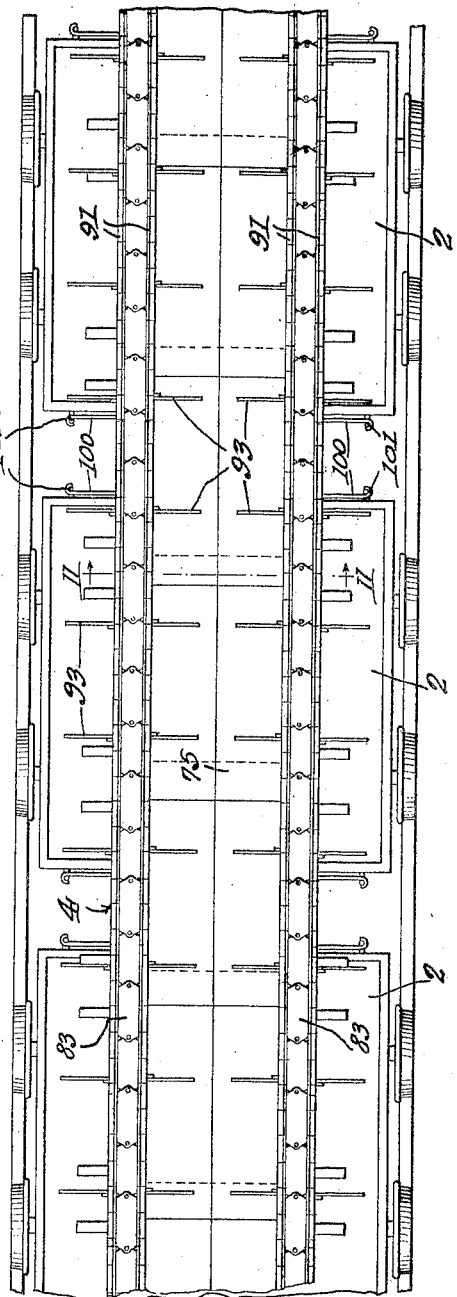
INVENTOR.
Roderick MacEachen
BY Jerry A Mathews
and Lester L Sargent
ATTORNEYS.

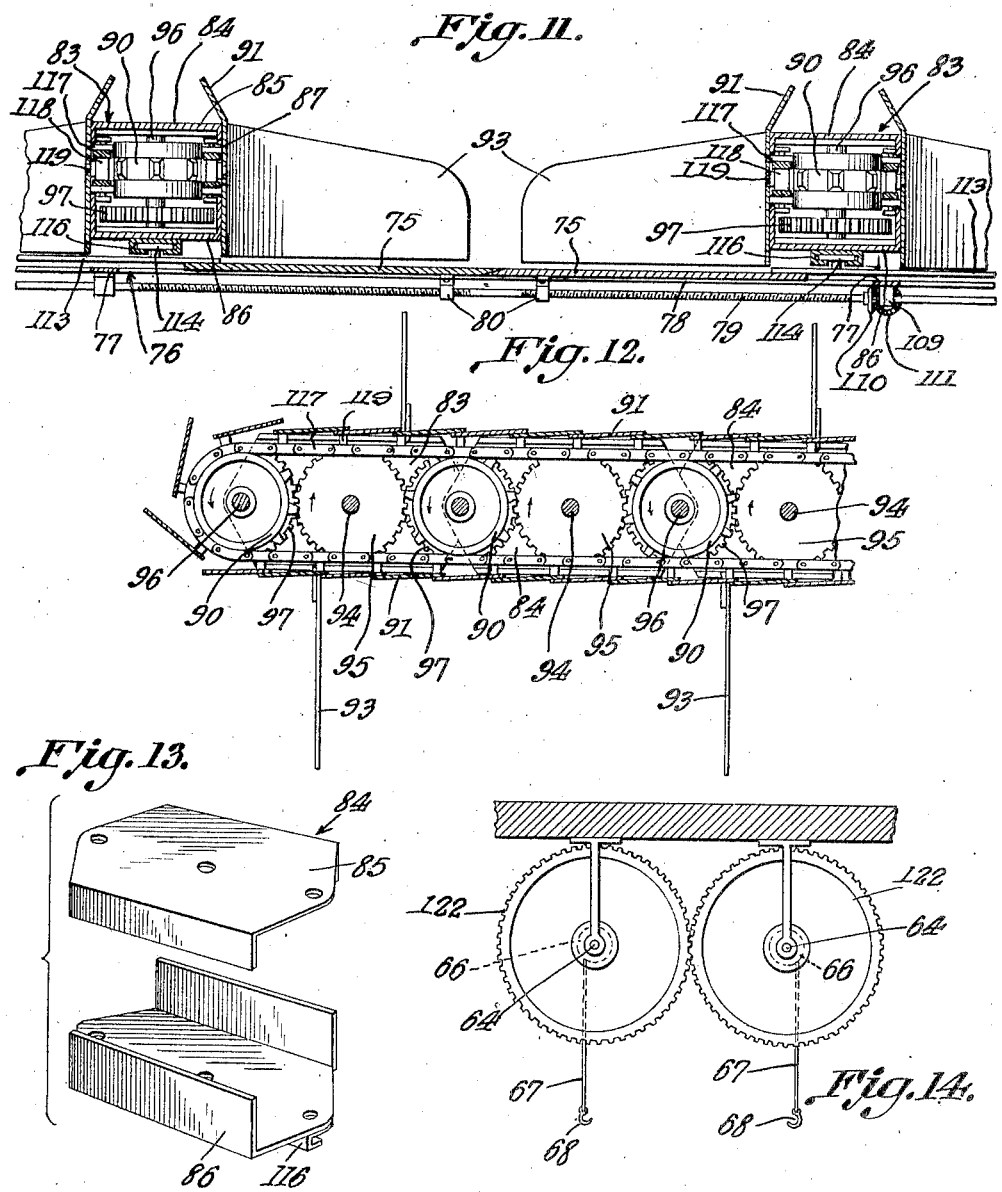

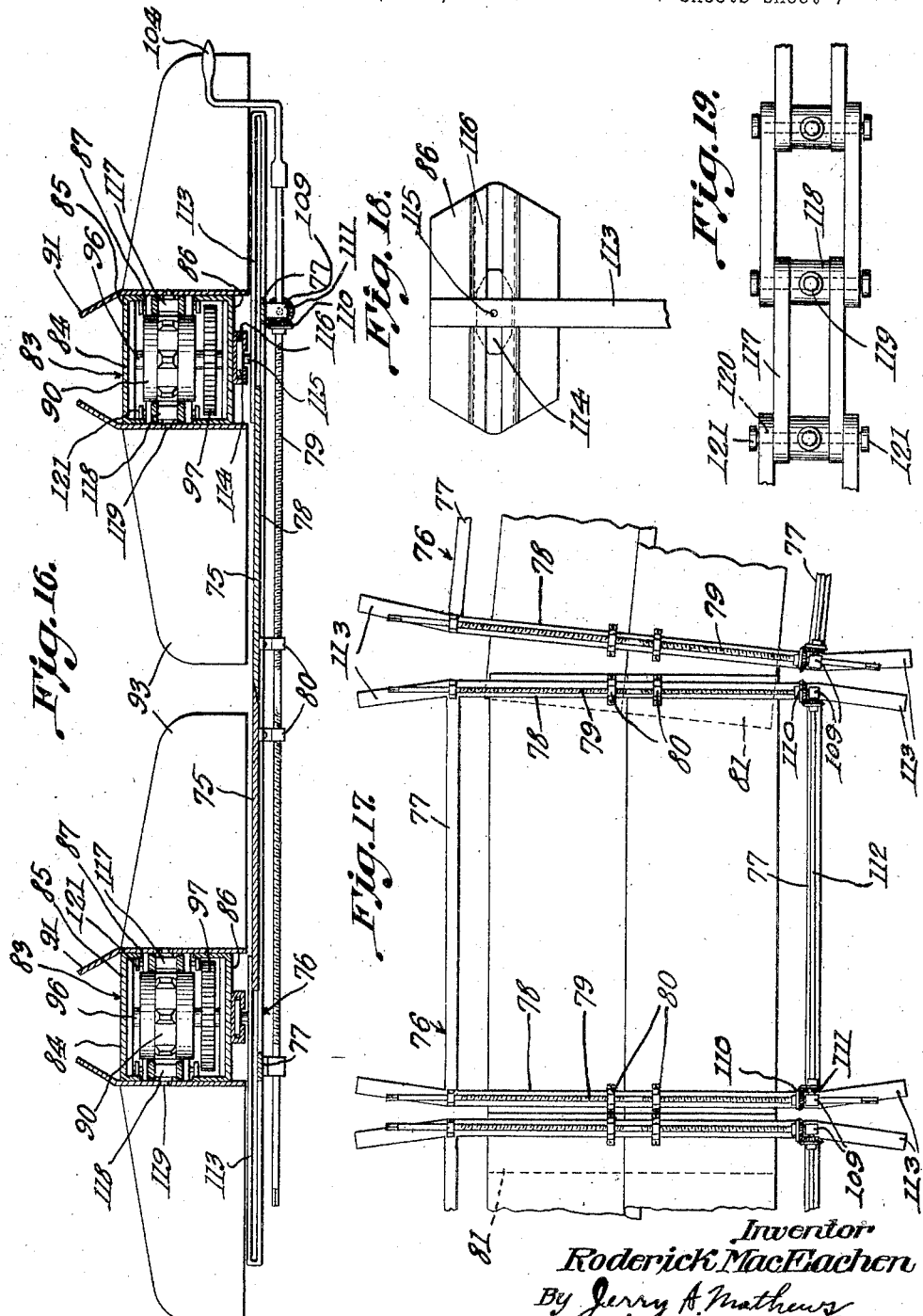

Patented Mar. 20, 1923.

1,448,756

UNITED STATES PATENT OFFICE.

RODERICK MacEACHEN, OF WASHINGTON, DISTRICT OF COLUMBIA.

COAL ELEVATING AND CONVEYING APPARATUS.

Application filed December 18, 1920. Serial No. 431,708.

*To all whom it may concern:*

Be it known that I, RODERICK MacEACHEN, a citizen of the United States, residing at Washington, in the District of Columbia, have invented a new and useful Coal Elevating and Conveying Apparatus, of which the following is a specification.

The object of my invention is to provide an efficient type of mechanically operated apparatus, driven by power, for rapidly elevating coal and thereafter conveying it to cars into which it is discharged; and to replace the hand labor heretofore required. It is a further object of my invention to provide an apparatus which will continuously handle a large quantity of coal. It is a further object of my invention to provide novel and efficient means for swinging the elevator apparatus to any given point for operation within a given arc.

It is within the contemplation of my invention to utilize the apparatus for handling any loose material, such as gravel or snow, as well as coal, and to make minor adjustments or modifications in the apparatus to accommodate the requirements of the material operated on by the machine. It is further my object to provide the novel combination and arrangement of parts disclosed, and especially to provide the novel form of endless elevating and endless conveying apparatus operating in unison and in pairs, as illustrated. These and other objects of my invention I attain by the mechanism illustrated in the accompanying drawings, in which—

Fig. 4 is a horizontal section illustrating the platform attached to the power car and carrying apparatus for lifting and swinging the elevator;

Fig. 5 is a cross-section of the elevator;

Fig. 6 is a longitudinal section through the elevator mechanism, showing details of the elevator structure;

Fig. 7 is a detail section on line 7—7 of Fig. 6 on an enlarged scale, and showing the spring 41;

Fig. 8 is a detail perspective of one link of the chain and its attaching lugs for securing the paddle;

Fig. 9 is a side elevation of the horizontal conveyor mounted on the cars, with a portion shown in section;

Fig. 10 is a top plan of the horizontal conveyor;

Fig. 11 is a cross-section on line 11—11 of Fig. 10;

Fig. 12 is a section on line 12—12 of Fig. 9;

Fig. 13 is a detail perspective of the top and bottom members of the flexible chain housing;

Fig. 14 is an end elevation of the housing apparatus;

Fig. 15 is a perspective view of the elevator shovel and boots;

Fig. 16 is a cross-section on the line 11—11 of Fig. 10, but showing a modification in detail of the endless chain;

Fig. 17 is a bottom plan of a portion of the horizontal conveyor;

Fig. 18 is a detailed view of the pivotal connection for the chain housing of the horizontal conveyor;

Fig. 19 is a detail view of the section of the preferred form of driving chain shown in Fig. 16;

Fig. 20 is a detailed view of one of the chain sleeves 118.

Fig. 21 is a detail perspective view of rack 48 and its supporting means; and

Fig. 22 is a detail perspective view of members 128 and 129.

Like numerals designate like parts in each of the views.

Figure 1:
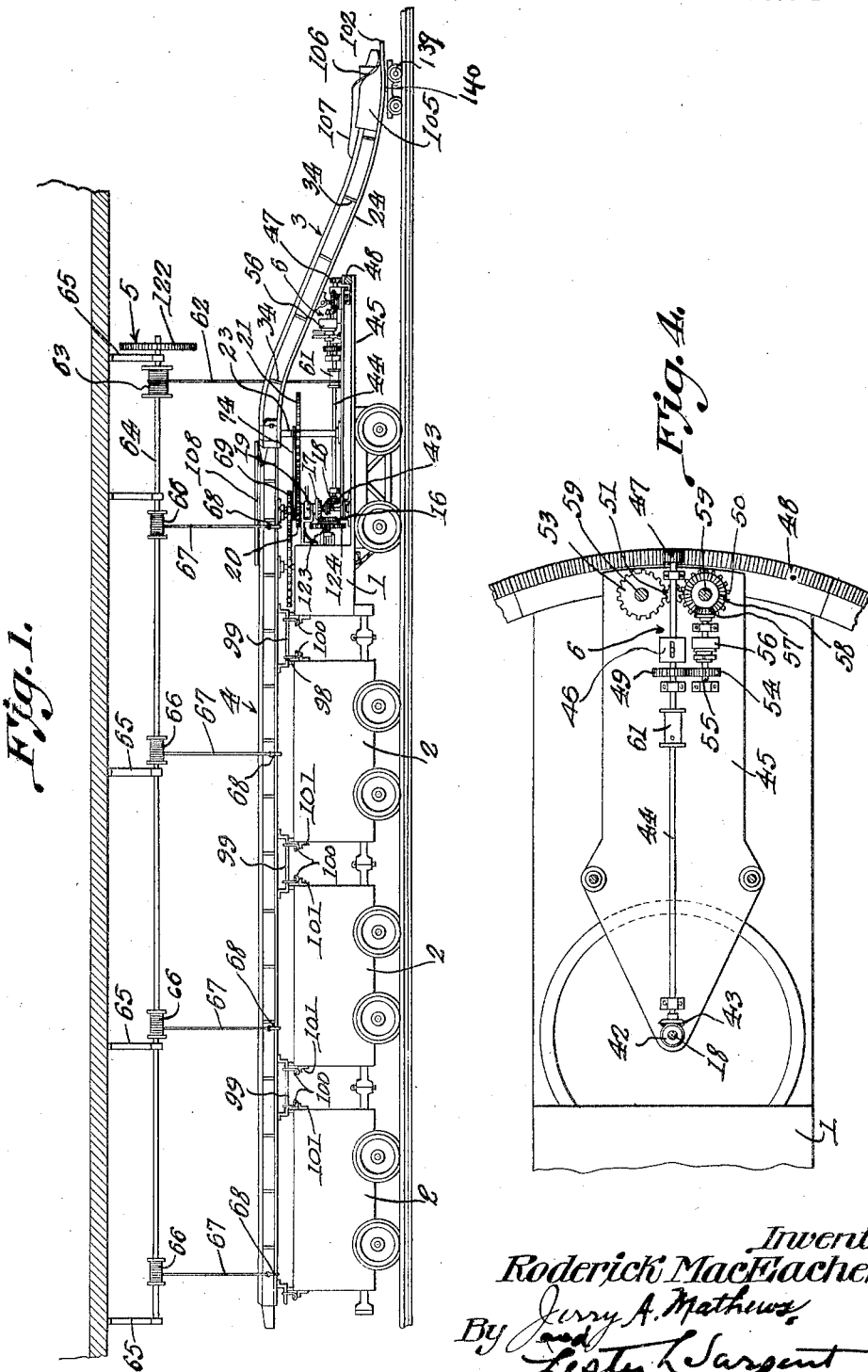
Figure 1 is an elevational diagrammatic view of the entire apparatus.

Referring to the accompanying drawings, I provide a suitable power car 1 to which the usual coal cars 2 are attached, and above which is mounted the horizontal conveyor 4 which receives the coal from my novel elevator 3, the operating position of which is controlled by the elevator lifting mechanism 6. The conveyor may be raised and lowered by the hoisting apparatus 5, as illustrated in Fig. 1.

Figure 2:
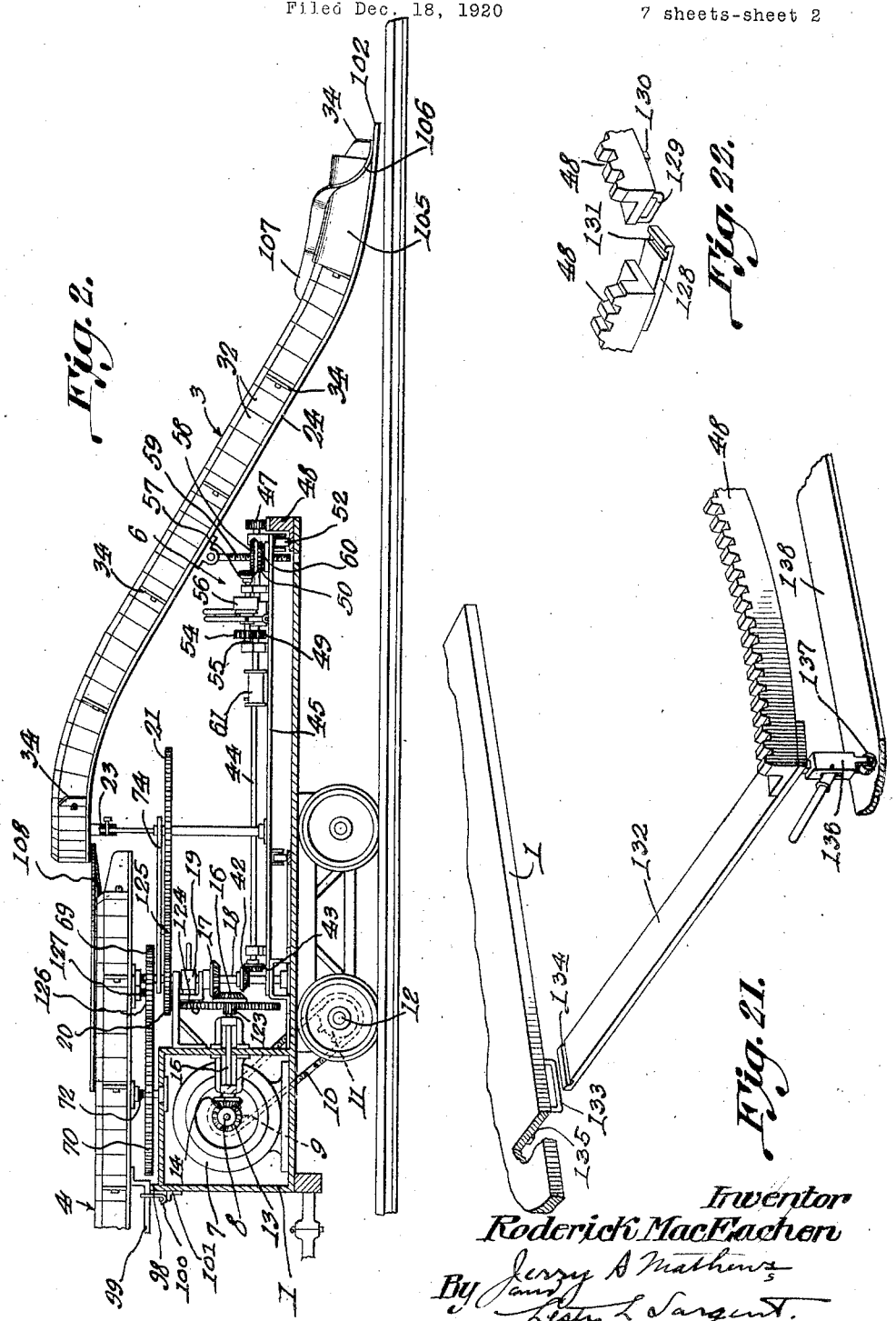
Fig. 2 is a side elevation of the elevator and associated mechanism within the interior of the power car.
Figure 3:
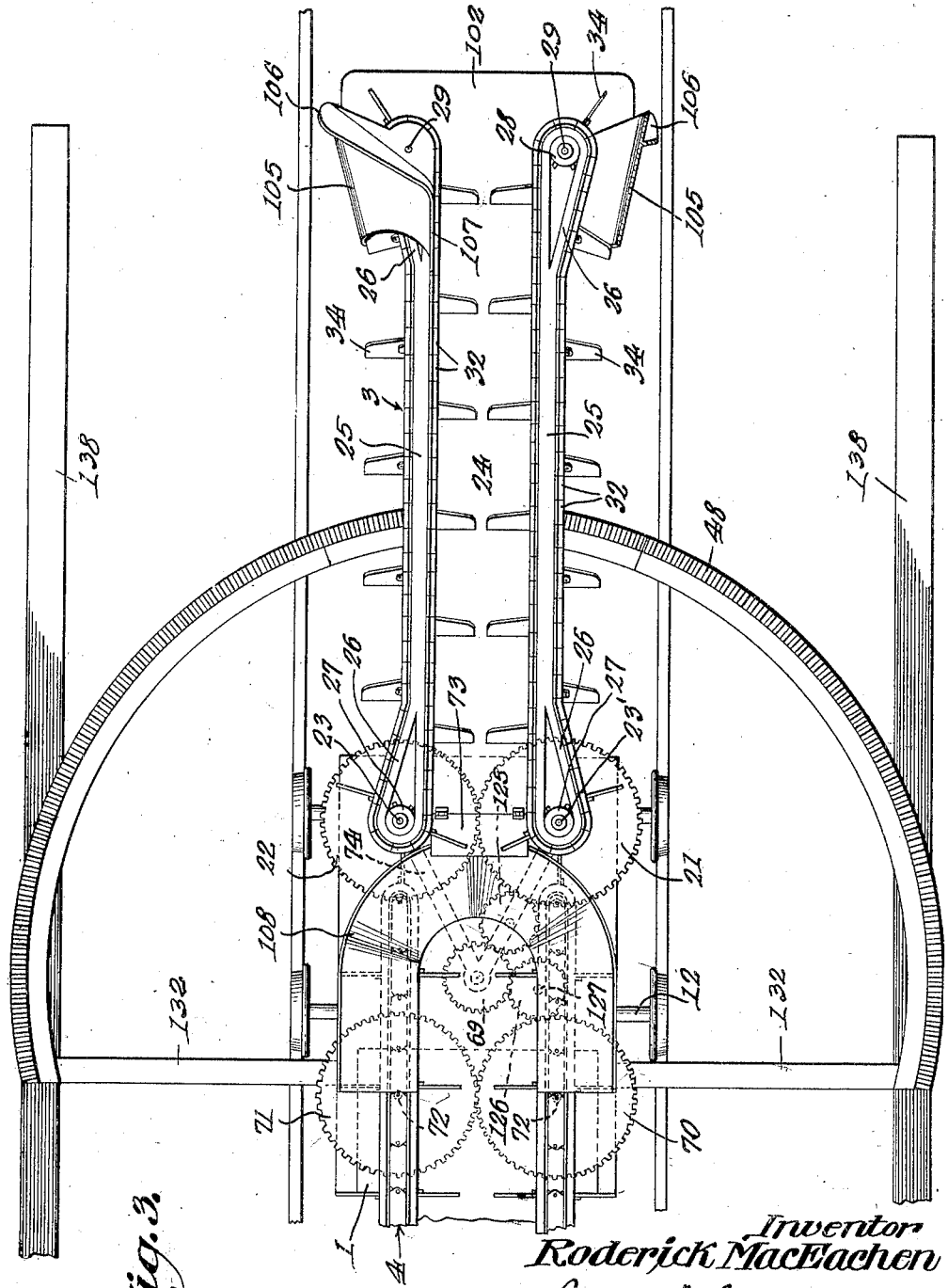
Fig. 3 is a top plan of the elevator and the adjacent or receiving end of the conveyor.

Referring to Fig. 2, I provide in the power car 1 a suitable motor 7, the driving shaft 8 of which carries a suitable sprocket 9 and a driving chain 10, which in turn drives the sprocket 11 on one of the car axles 12. I may provide a driven shaft in place of and having equivalent operation of chain 10 for driving shaft 12 from shaft 8. Any suitable clutch 19 for shifting the power on and off may be provided. I provide a suitable bevel gear 13 on the shaft 8, this gear meshing with gear 14 on horizontal shaft 15, which in turn carries a small pinion 123 meshing with the gear 124 which also carries the bevel gear 16, which latter gear meshes with a bevel gear 17 mounted on the upper end of shaft 18. I provide a suitable pinion 20 meshing with a suitable intermediate gear 125 which in turn meshes with the large gear 21 on the telescopic vertical shaft 23, as shown in Fig. 3. A corresponding shaft 23' carries a large gear 22 meshing with and driven by the large gear 21. The two shafts 23', both of which pivot at their lower ends on platform 45, each carry a sprocket 27 positioned within the respective looped ends 26 of elevator chain housings 25, which ride on the inclined bottom plate 24 of the elevator. Shafts 23' carrying the upper end of the elevator are arranged to be raised and lowered so that the elevator may be brought to a lowered position to facilitate transportation of the apparatus through the mine. Each of the shafts 23 is a telescopic shaft and the telescopic sections of same are square in cross section. Vertical shaft 18 is a telescopic shaft and shaft 127 which carries the pinions 126 also is telescopic.

Referring to Fig. 1, I may provide a suitable light four-wheeled truck 139 to be placed under the lower end of the elevator 3 to facilitate transportation of the elevator from one place to another. Truck 139 will be connected to the elevator by a suitable vertical pin 140, the truck being dragged freely with the whole machine.

Referring to Fig. 3, I provide lower sprockets 28 for carrying the chain shields 32 at the foot of the elevator apparatus. At the lower end of the elevator bottom plate 24, I provide a suitable rigidly mounted shovel member 102.

Referring to Figs. 5 and 6, relating to details of the construction of the elevator mechanism, I provide paddles 34, mounted at suitable intervals on extensions 33 by lugs 31 on the bolts 40 of endless sprocket chains 30. Chains 30 are operated within chain housings 25, each of which is provided with a vertical partition 35. For this I may also use chains as described in Fig. 12 for conveyor. Mounted midway of partition 35, I provide suitable sprockets 36 bearing on the endless chains 30.

Referring to Fig. 7, the endless chains consist of the center links 38 and the outer links 39, flexibly connected by the bolts 40, under the heads of which are positioned springs 41, as shown in Fig. 7, which afford a degree of vertical flexibility to the elevator chain, the holes in links being slightly oblong.

Referring to Fig. 4, which illustrates means for swinging the lower end of the elevator radially, and also means for raising and lowering the same to shift it from one operative position to another, and also to lower the upper end to facilitate transportation through the mine passage. I provide a shaft 18, which functions as the pivot point of platform 45, which carries the elevator controlling mechanism. Shaft 18, as shown in Figs. 2 and 4, carries a beveled gear 42, which meshes with the beveled gear 43 on shaft 44, mounted on platform 45 and carrying a pinion 47 at its end suitably mounted on the arcuate rack 48. Rack 48, as illustrated in Figs. 3 and 4, is made in detachable sections so that the outer sections may be removable, to facilitate transportation of the machine through mine passages. I may provide any suitable means for reversing the direction of the swinging movement of platform 45, on or relative to rack 48. It is within the contemplation of my invention to provide suitable rollers 52 on the under side of the outer end of platform 45, to support the weight thereon on the flat extended portion of rack element 48, as illustrated in Fig. 2. The platform may be otherwise suitably supported, if preferred, as by a plurality of shafts attached to platform 45 and gears riding on rack 48. I provide suitable means for controlling the swinging movement of platform 45 and the elevator 3 which it carries, such as two-way clutch 46, which is adapted to reverse the direction of rotation of gear 47 on rack 48; or any other suitable and equivalent means for accomplishing the same end may be utilized.

For the purpose of supporting and raising and lowering the upper end of the elevator, I provide a plurality of threaded shafts 59 having a suitable pivoted connection with the under side of the elevator and at their lower ends carrying gears 53 and 58, which are operatively connected by an intermediate gear 51, so as to rotate in the same direction. The gear 58 is provided with vertical teeth 50, which mesh with the gear 51, as well as with beveled teeth, which mesh with the beveled pinion 57 carried by shaft 55, which shaft also carries the gear 54, meshing with gear 49 on shaft 44, by which the aforesaid mechanism is actuated. I provide a suitable clutch 56 on shaft 55 for shifting the device into and out of operation. Gear 58 is provided with a suitable friction bearing, such as the ball thrust 60, illustrated in Fig. 2.

Referring to Fig. 1, I provide means for raising and lowering the endless conveyor 4, which extends over the tops of cars, consisting of a drum 61, mounted on shaft 44 and connected by detachable cable 62 with a drum 63 on the horizontal shaft 64, which is suspended by suitable support 65. Shafts 64 above the conveyor on either side carry a plurality of drums 66, each carrying cable 67, to which are attached suitable hooks or hooking elements 68, engaging the horizontal conveyor 4. As illustrated in Fig. 9, I provide suitable brackets 99 mounted on the bottom of the conveyor. Brackets 99 are releasably supported at 98 on the slightly elevated ends of the coal cars. Brackets 99 carry catches 100 that are releasably engaged with suitable hooks 101, attached to the ends of the coal cars.

Referring to Figs. 2 and 3 I provide suitable means for driving the endless chains of the horizontal conveyor 4, said means including a pinion 69, mounted on vertical shaft 18, the pinion 69 meshing with pinion 126 which drives the large gear 70, which in turn meshes with a similar large gear 71 on a second telescopic shaft 72, said shafts furnishing the driving point for the conveyor chains 30, as illustrated in Fig. 3.

To guide the coal from the upper end of elevator 3, into the contiguous end of the horizontal conveyor 4, I provide a suitable chute 73, such as is illustrated in Fig. 3, or any equivalent means for guiding the coal from the top of the elevator into the horizontal conveyor. To steady the upper end of the elevator 3, I provide a V-shaped bracket 74, as shown in dotted lines in Fig. 3, supporting the upper end of telescopic shafts 23 and 23'.

Referring to Figs. 16 and 17, the horizontal conveyor 4 is provided with suitable sectional bottom plates 75, preferably of rectangular shape, and arranged in overlapping position, as illustrated, and supported on open frame 76, which consists of horizontal side bars 77 and cross bars 78. In order to readily shift these plates to dump coal from the conveyor into the empty cars beneath, I provide crank shafts 79, threaded as shown, and in operative engagement with threaded rings 80 attached to plates 75, whereby adjacent plates can be simultaneously operated in reverse direction by rotating the handle 104 to withdraw the plates to either side of the conveyor and thus allow the coal to drop into cars beneath, thus making it possible for one man to operate the plates on both sides of the apparatus by the mechanism described.

The overlapping disposition of ends 81 of plates 75 accommodates the apparatus to the swinging movement of the conveyor in going around curves. Conveyor housing 83 consists of short flexible sections 84, consisting of an upper half 85 and a lower half 86, as shown in detail in Fig. 13. The chains extend through the opening 87, between the members 85 and 86 of the housing 84, to which are affixed the conveyor paddles 93. The endless conveyor chains 118 are driven by sprockets 90, as illustrated in Fig. 11. I provide guard plates or extensions 91 extending over the top of the conveyor chain housing 84 also in the elevator. The upwardly extended ends 98 of the coal cars provide a support for the brackets 99 and support the horizontal conveyor.

Referring to Figs. 11 and 12, illustrating the means for driving the horizontal conveyor chains, I provide shafts 96 at the ends of sections carrying the sprockets 90, which drive the horizontal conveyor chains. The shafts 96 also carry the gears 97, which mesh with gear wheels 95, mounted on shafts 94, intermediate of the housing section 84, and meshing with a similar gear 97, at the end of the next section. One of the sets of gears 97 and 70, for each horizontal conveyor chain, is mounted on the respective telescopic driving shaft 72.

Referring to Fig. 3, I provide a suitable concave plate 108 at the receiving end of the horizontal conveyor, to direct the coal from the elevator to the conveyor.

Referring to Fig. 14, I provide suitable gearing 122 operatively connecting the horizontal shafts 64 of the apparatus used to raise and lower the horizontal conveyor, this gearing being arranged to rotate these horizontal shafts 64 in the same direction.

Referring to Figs. 16–20, I provide suitable bearings 109 for a threaded shaft 79. I provide suitable beveled pinions 110, on shaft 79, which mesh with beveled pinions 111 on shafts 112. Shafts 112 extend substantially the length of one of the plates and function to operatively connect the shaft 79 at each end of the plates, whereby to properly distribute the power to either end of the plates for moving them laterally to empty the coal from the horizontal conveyor into the cars beneath.

I provide plate 78 with a reversely bent portion 113, which furnishes a support for the pivot 115, which carries the pivoted oval plate 114, which is longitudinally slidable in the longitudinal guide 116, mounted on the bottom of chain housing 86, as shown in Figs. 16 and 18. Referring to Fig. 19, I provide suitable sleeves 118 on the bolts 120 for connecting the links of the modified chain 117. Sleeves 118 are provided with pins 119 on chain 117, which pass through plate 91. Bolts 120 are provided with end rollers 121, which ride on the chain housing and eliminate friction.

Referring to Figs. 2 and 3, I provide suitable boots 105, mounted over the lower ends of the elevator chains and extending to the edge of the shovel 102. Said boots are provided with parallel flanges 107 and flaring flanges 106, to serve to direct any loose coal onto the shovel into position to be swept up by the blades 34 of the elevator.

Referring to Figs. 3, 21 and 22, the outer sections of rack 48 are supported on suitable jacks 136 which are mounted on suitable casters 137 resting on suitable rails 138. The ends of the outer sections of rack 48 are each provided with a link 132 adapted to be inserted through the depending loop 133 so that the grooves 134 will engage the corresponding lugs 135 on the under side of member 1. Intermediate and outer sections of rack 48 are releasably connected to each other by the tongue 128 which is adapted to slip through loop 129 and have its groove portion 131 engage the lug 130 on the under side of rack 48, as shown in Fig. 22.

The operation of the apparatus is as follows:

The power car is driven to a position which forces the shovel member beneath the loose coal, which is swept into and up the elevator continuously by the paddles 34 carried by the endless chains 30, which are arranged as shown in Fig. 3 and travel in a parallel direction, the paddles being swung toward each other at the lower end of the elevator and away from each other at the upper end of the elevator to convey the coal upward. As the elevating of the coal proceeds, the lower end of the elevator is swung radially as necessary to reach the coal to the extent permitted by rack 48, to increase the range of operation of the apparatus while the power car is in one position. The elevator may be swung radially, or elevated, or lowered; and drum 61 for raising the conveying mechanism may be operated without operating the whole machine under the control of a suitable clutch. The upper end of the elevating apparatus, when positioned for operation, is as shown in Fig. 2, above the horizontal conveyor into which it discharges the coal from its upper end. For purposes of transportation through the lower passages of the mine, the upper end of the elevator may be lowered by means of the threaded shafts 59 and the rest of the elevator lifting apparatus 6, heretofore described in detail. The coal discharged from elevator 3 onto the horizontal conveyor 4 is carried along over the cars on which this horizontal conveyor is supported while the apparatus is in operation. The horizontal conveyor is driven from shaft 72, by means of the series of gears and gear wheels illustrated in Fig. 12.

The coal is continuously dumped into the cars by the endless conveyor, the coal dropping through the openings left when plates 75 have been withdrawn or moved out laterally to the extent permitted. As soon as one car is filled the plates are operated to closed position by turning the screw-threaded shafts 79 by means of handle 104, thus simultaneously closing the opposite plates 75, as will be apparent by reference to Figs. 16 and 17. Plates over the forward end portions of the cars are first opened to receive the coal as it is swept along by the conveyor and then the plates are successively opened in order, moving toward the rear of the line of coal cars, the opening of the plates 75 being effected by turning the handles 104, as illustrated in Fig. 16.

The removable plates 75, which support the coal carried in the horizontal conveyor 4, are of sufficient size to overlap, both longitudinally and at their ends, as shown in the drawings, thus making it possible to withdraw them in the manner illustrated. The arrangement of overlapping ends adds to the lateral flexibility of the horizontal conveyor. The horizontal conveyors also have the chains arranged in pairs and spaced substantially similar to the conveyor chains of the elevating mechanism, whereby the oppositely arranged paddles 93 will carry the coal along from the elevator to the various coal cars. The horizontal conveyors travel in a like direction and are simultaneously operated in the direction indicated by the arrows in Fig. 3 and as above described. A motor 7, within the power gear, furnishes power to operate all the mechanism described, and also is arranged to drive the car itself.

I may utilize the apparatus for the handling of any loose material other than coal, such as gravel, snow, etc., and I may employ suitable mechanical equivalents for the various parts of the apparatus where same may be suitable, without essentially modifying the novel combination and arrangement of the parts above described, as heretofore claimed.

What I claim is:

1. In an elevator, the combination of a pair of endless chains, each carrying a series of spaced paddles, said paddles being oppositely disposed to sweep material along the elevator, and bottom plates for the elevator, resilient means for giving a limited degree of vertical flexibility to the endless chains, housing means for the endless chains, and means for synchronously driving said endless chains.

2. In combination with the apparatus described in claim 1, a shaft member affixed to the lower and of the elevator and a discharge chute affixed to the upper end of the elevator whereby to more efficiently gather in and discharge the material handled by the elevator.

3. In a coal conveying apparatus, a flexible conveyor, said conveyor comprising a series of plates, said plates having their ends overlapping the ends of longitudinally alined sets of plates and having contiguous edges overlapping laterally, means for independently supporting each set of plates, whereby to give the conveyor a considerable degree of flexibility to permit a sinuous movement or adjustment of same.

4. In a horizontal conveyor, the combination of a pair of endless chains, said chains being spaced apart and each chain having a series of laterally extending paddles, the paddles on one chain being aligned opposite the paddles on the other chain, said paddles having their free ends in close proximity, means for driving said chains, a series of removable overlapping plates forming the bottom of the horizontal conveyor, and an open flexible framework on which said bottom plates are removably mounted.

5. In a horizontal conveyor, the combination of a pair of endless chains, said chains being spaced apart, and each chain having a series of laterally extending paddles, the paddles on one chain being aligned opposite the paddles on the other chain, means for driving said chains, a series of overlapping plates forming the bottom of the horizontal conveyor, means for supporting said plates in normal position, means for securing said plates in their overlapping relation, and means for readily withdrawing any of said plates to dump the material carried thereon.

6. In a flexible endless conveyor, as a new article of manufacture, a bottom plate for the endless conveyor, consisting of a flat plate of general rectangular shape and with an extended end, and brackets secured to the under side of the plate near its outer edge and handles having a screw threaded portion mounted on said brackets and adapted to secure the plates in position on the frame-work element, said plate being of sufficient width so that it will overlap the corresponding oppositely positioned plate when mounted in place on the conveyor.

7. In a flexible conveyor for conveying material from an elevator to a series of cars in a mine an endless conveyor comprising a pair of endless chains each having a series of laterally projecting paddles, the paddles on one chain being disposed opposite the paddles on the other chain while in working position, power means for synchronously driving the aforesaid pair of endless chains, and means depending from the roof of the gallery of the mine for supporting said endless conveyor on the tops of cars.

8. In combination with the apparatus described in claim 7, power controlled means for raising and lowering the flexible conveyor.

9. In combination with the apparatus described in claim 7, means suspended from the roof of the gallery of the mine for raising and lowering the flexible conveyor.

10. In a coal elevating apparatus, the combination of an inclined bottom member, a pair of endless chains mounted on and extending the length of said bottom member, said chains having a series of spaced paddles, the paddles being of sufficient length and with paddles of each chain positioned in alignment to act substantially as a unit in sweeping the coal into and up the elevating apparatus, a shovel at the lower end of the elevating apparatus arranged to provide a firm support for the paddles and to permit of readily moving the device into operative position relative to the coal, means for simultaneously operating the two endless chains, and means for supporting the elevating apparatus, said means being suitably arranged to raise and lower the lower end of the elevating apparatus to suitably position it for operation or for transportation, and power operated means for adjusting the aforesaid means supporting the elevating apparatus.

11. In a coal elevator, the combination of an inclined bottom member, a pair of endless chains mounted on and extending the length of said bottom member, said chains having a series of like spaced paddles, the paddles on one chain being disposed in alignment with those on the opposite chain and traveling in the same direction to act as a unit, roller bearings positioned under and at the sides of the endless chains, housings for the chains, means for simultaneously operating the endless chains from a source of power, a plurality of threaded shafts supporting the elevator and disposed to raise and lower the upper end of the elevator as required, power operated means for actuating the threaded shafts, manually controlled and power operated means of raising and lowering and swinging the lower end of the elevator in an arc of predetermined size to extend the range of operation of the machine on both sides of the car track, the aforesaid means including a sectional arcuate rack, the sections of which may be detached for purposes of transportation, a gear on said rack, a shaft for the gear, clutch means for controlling the direction of rotation of the gear, and suitable power means for rotating the gear shaft in the required direction for swinging the elevator's lower end to the desired portion of the arc within which it may be operated.

12. In combination with the elevator described in claim 11, a horizontal conveyor driven from a common source of power to convey material from the upper end of the elevator to cars beyond, and means for dumping the material from said horizontal conveyor into the cars.

13. In a horizontal flexible conveyor for conveying material from an elevator to a series of cars in a mine, an endless conveyor comprising a pair of endless chains, each having a series of laterally projecting paddles, the paddles on one chain being disposed opposite the paddles on the other chain while in working position, power means for synchronously driving the aforesaid pair of endless chains, means suspended from the roof of the gallery of the mine for raising and lowering the flexible conveyor, and means for flexibly supporting said endless conveyor on the tops of the cars, said means being attached to the cars.

14. In a horizontal conveyor, means for supporting the aforesaid conveyor on the tops of a series of cars, a plurality of endless chains, each of the chains having spaced paddles oppositely arranged in conveying the material, said chains being driven in opposite directions, means for driving the aforesaid chains from a point some distance from the ends of the chains, said means including a series of gears and gear wheels meshing with each other and with the sprockets of the chains, power means for driving the aforesaid gears from the predetermined power point, bottom plates under the chains and affording a support for the material conveyed, and open frame-work supporting the said bottom plates in a firm but removable position.

15. In combination with the apparatus described in claim 14, manually operated means for laterally moving opposite bottom plates of the horizontal conveyor in opposite directions to dump the material therefrom.

16. In an apparatus of the class described, an elevator consisting of a plurality of endless chains each carrying spaced paddles, the free ends of the paddles being positioned in close proximity, so that opposite paddles will coact in conveying the material, a shovel member attached to the lower end of the elevator, hood-like boots engaging over the lower ends of the elevator, said boots having flaring flanges shaped to guide any falling coal into the shovel member in position to be swept up by the paddles of the elevator, substantially as described.

17. In combination with the apparatus described in claim 3, manually operable means for lateral adjustment of each set of adjacent plates relative to each other and independently of the set next adjacent thereto, for dumping the contents of any particular plates of the conveyor.

18. In combination with the apparatus described in claim 3, means suspended from the roof of the gallery of a mine for raising and lowering the horizontal conveyor to and from the tops of series of coal cars in the gallery.

19. In combination with the apparatus described in claim 3, power operated means for conveying coal along the horizontal conveyor, and means for flexibly guiding said coal conveying means to permit of sinuous movement thereof.

20. In a coal conveying apparatus, a flexible conveyor comprising a series of flexible plates arranged in sets, the plates of one set having their ends overlapping the ends of the set beyond, means for moving any given set of plates laterally to dump the contents thereof at will, coal conveying apparatus arranged to sweep material longitudinally of the plates, means for permitting said conveying apparatus to swing pivotally to either side, longitudinal guide means for said apparatus on the plates, whereby to permit sinuous movement of both the series of plates and the coal conveying apparatus.

21. In combination with the apparatus described in claim 20, vertically arranged overlapping plates attached to the coal conveying apparatus to protect the mechanism from coal dust, substantially as shown.

22. In a flexible coal conveying apparatus, a flexible conveyor comprising a series of sets of overlapping plates, threaded rings depending from the respective plates, threaded rods operatively engaging the rings, said rods being oppositely threaded under the respective plates to permit of simultaneous movement of the plates away from each other to dump the contents thereof, longitudinal guiding means mounted on the plates, coal conveying mechanism slidably mounted on the plates and including a guide element slidable in the longitudinal guiding means and capable of swinging movement to either side, for the purposes described.

23. In a flexible coal conveying apparatus, a flexible conveyor comprising a series of sets of overlapping horizontal plates, means for independent lateral movement of any given set of plates to dump the contents of that set, a flexible conveying mechanism for conveying coal over said plates, said mechanism comprising flexible chain means, spaced paddles mounted on said flexible chain means, flexible housing means encasing said chains, and flexible means for guiding the chain housing means longitudinally of the horizontal plates.

24. In a flexible coal conveying apparatus, a plurality of chain-operated flexible conveyors having oppositely positioned spaced paddles for conveying the coal, a series of flexible horizontal plates over which said conveying means operate, and flexible housing means encasing said chains, said housing means comprising a series of housing plates above and below the chain, each plate having broadly V-shaped ends, the ends of one plate being operatively attached to the ends of the next adjacent plate.

25. In combination with the apparatus described in claim 14, means operatively connected with the bottom housing plate for flexibly guiding the conveying mechanism over the horizontal plates.

26. In combination with the apparatus described in claim 14, means operatively connected with the bottom housing plate for flexibly guiding the conveying mechanism over the horizontal plates, and manually operated means for laterally moving any desired set of horizontal plates to dump the contents thereof.

27. In a coal handling apparatus, the combination of a flexible conveying apparatus, and a flexible housing encasing said flexible conveying apparatus, the housing and the conveying apparatus both being capable of lateral movement in either direction.

28. In a coal handling apparatus, the combination of a plurality of flexible conveyors having oppositely positioned paddles, the free ends of which are disposed in proximity to each other, a flexible material holding means over which said conveyors operate, and flexible housing means encasing the operating mechanism of said conveyors, each of the aforesaid mechanisms being entirely flexible and capable of lateral movement in either direction.

29. In a flexible coal conveyer, the combination of conveyer housing plates, said plates having a channel iron member rigidly attached to the plates and extending longitudinally thereof, supporting means for the plates, said supporting means including a swingable loosely mounted guide element slidably engaged in the channel iron member to guide the housing plates and adapted to permit them to recede and advance as the curvature of the course of travel of the conveyer may require.

RODERICK MacEACHEN.